July 31, 1962

A. E. GERSCH 3,047,805

METER MOVEMENT

Filed Feb. 12, 1960

INVENTOR
Adolph E. Gersch

By John C Black
ATTORNEY

July 31, 1962

A. E. GERSCH 3,047,805

METER MOVEMENT

Filed Feb. 12, 1960

INVENTOR.
Adolph E. Gersch

By John C. Black
ATTORNEY.

United States Patent Office 3,047,805
Patented July 31, 1962

3,047,805
METER MOVEMENT
Adolph E. Gersch, Chicago, Ill., assignor to Stewart-Warner Corporation, Chicago, Ill., a corporation of Virginia
Filed Feb. 12, 1960, Ser. No. 8,414
3 Claims. (Cl. 324—150)

This invention relates to an improved wide scale meter construction.

The improved meter of the present application has been especially designed for use in an electrical tachometer. In the tachometer art, it is desirable to have an accurate, wide scale, linear meter movement. However, if it is to be acceptable for use in the automotive industry, it must necessarily be extremely economical. It is a further requirement that it have a high torque for a low power input.

Accordingly, it is an object of the present invention to provide an economical voltmeter which has a wide angle movement and which requires a relatively low power input.

Other objects and the various features of the present invention will be evident upon a perusal of the following description taken in conjunction with the accompanying drawings in which.

Figure 4:
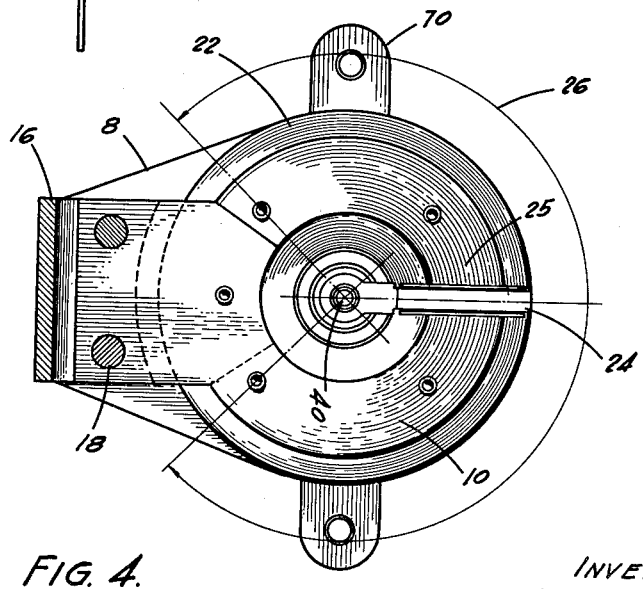
FIG. 4 is an elevation view of the pole piece and moving coil structure along line 4—4 of FIG. 3.

The improved meter mechanism comprises a pair of annular ceramic magnets 2 and 4. A pair of generally L-shaped brackets 6 and 8 are secured to and support the magnets 2 and 4. A laminated pole piece 10 is interposed between and in axial alignment with the magnets. The pole piece is retained between upwardly extending projections 12 and 14 on the brackets 6 and 8. The pole piece is formed from generally hook shaped laminations with the alternate laminations facing in opposite directions to present a closed circular appearance (FIG. 4).

A shallow U-shaped bracket 16 and screw and nut assemblies 18 retain the brackets 6 and 8, the magnets 2 and 4, and the pole piece 10 in fixed assembly. The magnets are axially polarized. A pair of annular pole pieces 20 and 22 are secured to the magnets by rivets 21 and 23 and are of similar polarity. The brackets 6 and 8 are of a magnetic material so as to magnetically connect the opposite poles of the magnet to the pole piece 10.

A generally rectangular coil 24 is circumferentially movable in an arc 26 around a circular portion 25 of the pole piece 10. Coil movement through an arc greater than 200° is possible. The coil 24 is carried by a pivot shaft assembly 28 which is carried by support bearing assemblies 30 and 32.

Figures 1, 2:
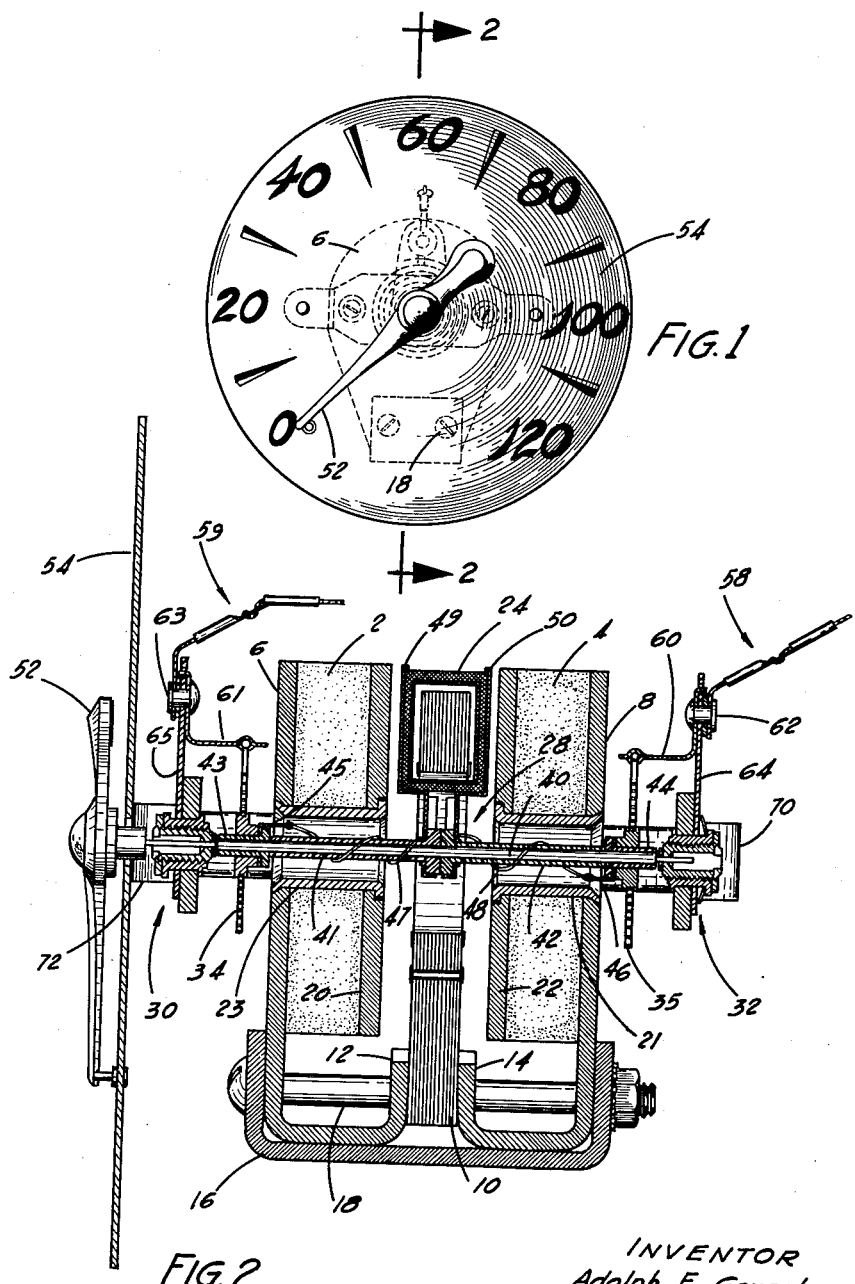
FIG. 1 is a front elevation view of the improved meter mechanism.
FIG. 2 is a side elevation section of the mechanism along line 2—2 of FIG. 1.
Figure 3:
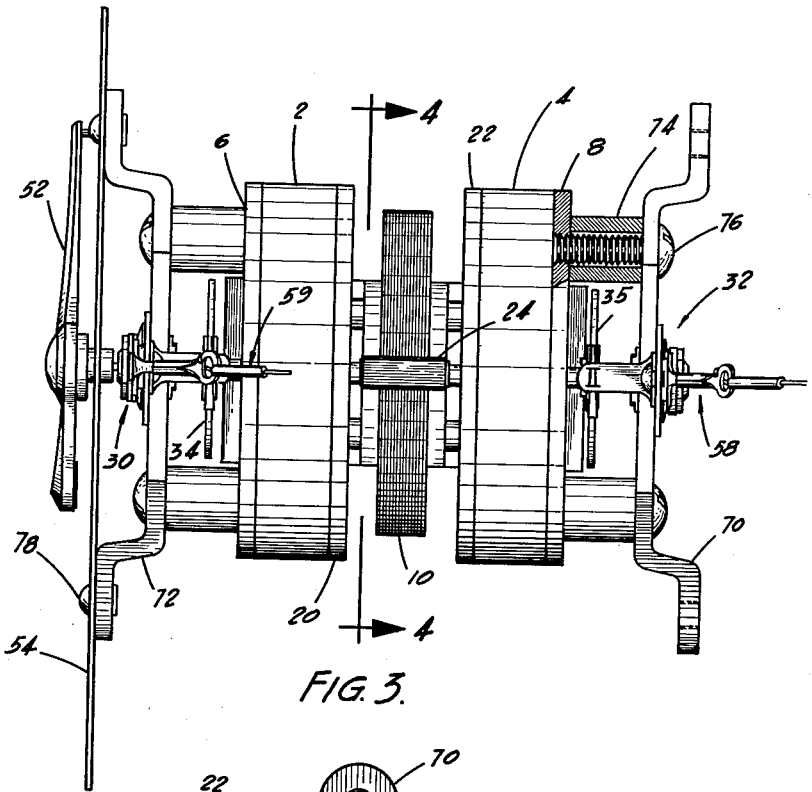
FIG. 3 is a plan view of the mechanism.

Biasing springs 34 and 35 urge the pivot shaft assembly 28 and the coil 24 counterclockwise (FIG. 1) to a zero position in a well known manner. Current in the coil urges the coil in a clockwise direction (FIG. 1) against the force of the biased springs to positions corresponding to the instantaneous magnitude of current flow.

The pivot shaft assembly 28 includes a metallic shaft 40 and insulating sleeves 41, 42, 43 and 44 carried on the shaft. The electrical connections to the coil are made by way of conductors 58, 59, spring anchor lugs 60, 61, springs 34, 35, terminals 45, 46, wires 47, 48 and brackets 49, 50. The conductors 58, 59 and the anchor lugs 60, 61 are connected by rivets 62, 63 and supported by insulation strips 64, 65. A pointer 52 is secured to the shaft 40 for angular movement therewith. The pointer 52 cooperates with an associated scale on face dial 54 to indicate engine speed. The meter assembly is suitably supported from a panel structure (not shown) by means of a pair of mounting brackets 70 and 72. Spacers 74 and screws 76 secure the brackets 70 and 72 to the brackets 8 and 6. The bracket 72 is secured to the face dial 54 by rivets 78.

Although the preferred embodiment uses two magnets, one magnet may be used.

While there has been described what is at present believed to be the preferred embodiment of the invention, it will be understood that various changes and modifications may be made therein; and it is contemplated to cover in the appended claims all such changes and modifications as fall within the true spirit and scope of the invention.

What is claimed is:

1. A wide scale meter movement comprising a pair of annular axially polarized ceramic magnets, a generally annular laminated pole piece, means including a pair of generally L-shaped brackets of magnetic material each connected to a similarly polarized end of a respective one of the magnets and to the pole piece mounting the magnets and pole piece in spaced coaxial relation between the brackets with the pole piece intermediate the magnets, a pair of flat annular pole pieces each secured to the other end of a respective one of the magnets, the opposed pole piece surfaces being parallel to form uniform air gaps, a coil encircling the laminated pole piece and pivotally mounted for movement along a substantial portion of the pole piece, and spring means urging the coil angularly to a start position.

2. A wide scale meter movement comprising a pair of annular axially polarized ceramic magnets, an annular laminated pole piece generally rectangular in cross section, means including a pair of generally L-shaped brackets of magnetic material each connected to a similarly polarized end of a respective one of the magnets and to the pole piece mounting the magnets and pole piece in spaced coaxial relation between the brackets with the pole piece intermediate the magnets, a pair of flat annular pole pieces each secured to the other end of a respective one of the magnets, the opposed pole piece surfaces being parallel to form uniform air gaps, a generally rectangular coil encircling the laminated pole piece and pivotally mounted for movement along a substantial portion of the pole piece, and spring means urging the coil angularly to a start position.

3. A wide scale meter movement comprising a pair of annular axially polarized ceramic magnets, a generally annular laminated pole piece, means including a pair of generally L-shaped brackets of magnetic material each connected to a similarly polarized end of a respective one of the magnets and to the pole piece mounting the magnets and pole piece in spaced coaxial relation between the brackets with the pole piece intermediate the magnets, a pair of flat annular pole pieces each secured to the other end of a respective one of the magnets, the opposed pole piece surfaces being parallel to form uniform air gaps, a generally rectangular coil encircling the laminated pole piece, a shaft and brackets pivotally mounting the coil for movement along a substantial portion of the laminated pole piece, a pair of anchored springs secured to opposite ends of the shaft urging the coil angularly to a start position, and means including the springs and brackets forming electrical connections for the coil.

References Cited in the file of this patent

UNITED STATES PATENTS

| | | |
|---|---|---|
| 1,165,745 | Benecke | Dec. 28, 1915 |
| 2,572,556 | Zar | Oct. 23, 1951 |
| 2,660,707 | Kelly | Nov. 24, 1953 |

FOREIGN PATENTS

| | | |
|---|---|---|
| 456,988 | Great Britain | Nov. 19, 1936 |
| 943,994 | France | Mar. 23, 1949 |